US012749845B2

(12) United States Patent
Iwakura et al.

(10) Patent No.: US 12,749,845 B2
(45) Date of Patent: Sep. 29, 2026

(54) CONNECTOR AND CONNECTOR UNIT HAVING A PAIR OF POSITIONING RIBS

(71) Applicant: Yazaki Corporation, Tokyo (JP)

(72) Inventors: Kouki Iwakura, Makinohara (JP); Toshikazu Yoshioka, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 357 days.

(21) Appl. No.: 18/613,568

(22) Filed: Mar. 22, 2024

(65) Prior Publication Data

US 2024/0356269 A1 Oct. 24, 2024

(30) Foreign Application Priority Data

Apr. 19, 2023 (JP) ................................ 2023-068556

(51) Int. Cl.
*H01R 13/516* (2006.01)
*H01R 13/631* (2006.01)

(52) U.S. Cl.
CPC ......... *H01R 13/516* (2013.01); *H01R 13/631* (2013.01)

(58) Field of Classification Search
CPC ..... H01R 13/516; H01R 13/64; H01R 13/631
USPC ........................................ 439/374, 378, 680
See application file for complete search history.

(56) References Cited

U.S. PATENT DOCUMENTS 4,998,892 A * 3/1991 Shiley .................. H01R 13/631 439/378
5,466,171 A * 11/1995 Bixler ................ H01R 13/6315 439/378
5,709,560 A * 1/1998 Hio .................. H01R 13/62933 439/157
5,989,040 A * 11/1999 Nishimatsu .......... H01R 12/725 439/680
6,565,390 B2 * 5/2003 Wu .................... H01R 12/7005 439/378
7,556,537 B2 * 7/2009 Schenk .............. H01R 13/6272 439/378
8,182,296 B2 * 5/2012 De Blieck .............. H01R 43/02 439/378
2005/0095913 A1 * 5/2005 Fan ...................... H01R 13/658 439/607.35
2011/0008992 A1 * 1/2011 Algüera Gallego ..... B60D 1/64 439/378

(Continued)

FOREIGN PATENT DOCUMENTS

JP 5-45947 U 6/1993
JP 8-45609 A 2/1996

(Continued)

*Primary Examiner* — Hae Moon Hyeon
(74) *Attorney, Agent, or Firm* — Sughrue Mion, PLLC

(57) ABSTRACT

A connector is fittable to a mating connector and includes at least one plate-shaped terminal, and a housing that supports the terminal. The housing includes: a base that supports the terminal; a hood portion that is provided to protrude from the base toward the mating connector and surrounds the terminal; and a positioning rib that is formed to extend toward the mating connector, and a pair of the positioning ribs is provided on both sides of the terminal in a plate width direction inside the hood portion, a root is continuous with the base, and a distal end portion is provided to protrude from the hood portion.

4 Claims, 4 Drawing Sheets

(56) References Cited

U.S. PATENT DOCUMENTS

| | | | | |
|---|---|---|---|---|
| 2012/0045945 | A1* | 2/2012 | Tai | H01R 13/6456 439/680 |
| 2013/0252477 | A1* | 9/2013 | Mcalonis | H01R 4/4881 439/680 |
| 2014/0302706 | A1* | 10/2014 | YuQiang | H01R 13/64 439/378 |
| 2021/0066853 | A1* | 3/2021 | Miller | H01R 13/516 |

FOREIGN PATENT DOCUMENTS

| | | | |
|---|---|---|---|
| JP | 2017-162594 | A | 9/2017 |
| JP | 2021-15702 | A | 2/2021 |

* cited by examiner

CONNECTOR AND CONNECTOR UNIT HAVING A PAIR OF POSITIONING RIBS

BACKGROUND

Technical Field

The present invention relates to a connector and a connector unit.

Related Art

Various electronic devices are mounted on automobiles, and wire harnesses are routed in order to transmit power, control signals, and the like to the electronic devices. The wire harness includes a plurality of electric wires and a connector and is connected to the electronic device or another wire harness by fitting the connector to a connector of the electronic device or a connector of another wire harness.

As a connector used for such a wire harness, a waterproof connector that is fastened to a case of a device mounted on a vehicle with a bolt is known (see, for example, JP 2017-162594 A).

The waterproof connector in the related art disclosed in JP 2017-162594 A is fitted to a counterpart connector provided in the case of a device and includes a pair of terminals respectively connected to terminals of a pair of electric wires, and a housing that supports the pair of terminals.

Each terminal integrally includes a wire connection portion connected to each electric wire and a terminal connection portion connected to a mating terminal of the counterpart connector.

The housing has a columnar shape that is horizontally long in the width direction and is formed by insert-molding a pair of terminals in a state of being aligned in the width direction with a synthetic resin. Also, the housing includes a buried portion that holds the pair of terminals in a state of being aligned in the width direction and a pair of tubular portions provided forward from the buried portion. Each tubular portion has a rectangular cylindrical shape in a front view and is provided so as to individually surround the terminal connection portion protruding forward from the buried portion so as to accommodate the terminal connection portion therein.

Patent Literature 1: JP 2017-162594 A

SUMMARY

A waterproof connector (connector) in the related art is required to have a configuration in which an axial dimension of each tubular portion is longer than an axial dimension of a terminal connection portion in order to secure assemblability at the time of fitting the connector to a counterpart connector. However, miniaturization in the axis direction (or radial direction) at the time of fitting the connector is required. That is, it is required to miniaturize the size in the axis direction (or radial direction) at the time of fitting the connector while securing the assemblability at the time of connector fitting.

An object of the present invention is to provide a connector and a connector unit that achieve miniaturization in a radial direction and an axis direction at the time of fitting the connector while securing assemblability at the time of fitting the connector.

In order to solve the problem and achieve the object, a connector according to the present invention that is fittable to a mating connector includes at least one plate-shaped terminal; and a housing that supports the terminal, in which the housing includes a base that supports the terminal, a hood portion that is provided to protrude from the base toward the mating connector and surrounds the terminal, and positioning rib that are formed to extend toward the mating connector, and a pair of the positioning ribs is provided on both sides of the terminal in a plate width direction inside the hood portion, roots of the positioning ribs are continuous with the base, and distal end portions of the positioning ribs are provided to protrude from the hood portion.

According to the present invention, it is possible to achieve the miniaturization of the size in the radial direction and the axis direction at the time of fitting the connector while securing the assemblability at the time of fitting the connector.

DETAILED DESCRIPTION

Hereinafter, an embodiment of the present invention is described with reference to FIGS. 1 to 4. A perspective view illustrating a terminal block 1 as a connector according to the embodiment of the present invention is provided. The terminal block 1 is fitted to a mating connector 10 described below to configure a terminal block unit 100 (connector unit) and to configure a wire harness routed in an automobile or the like.

Figure 1:
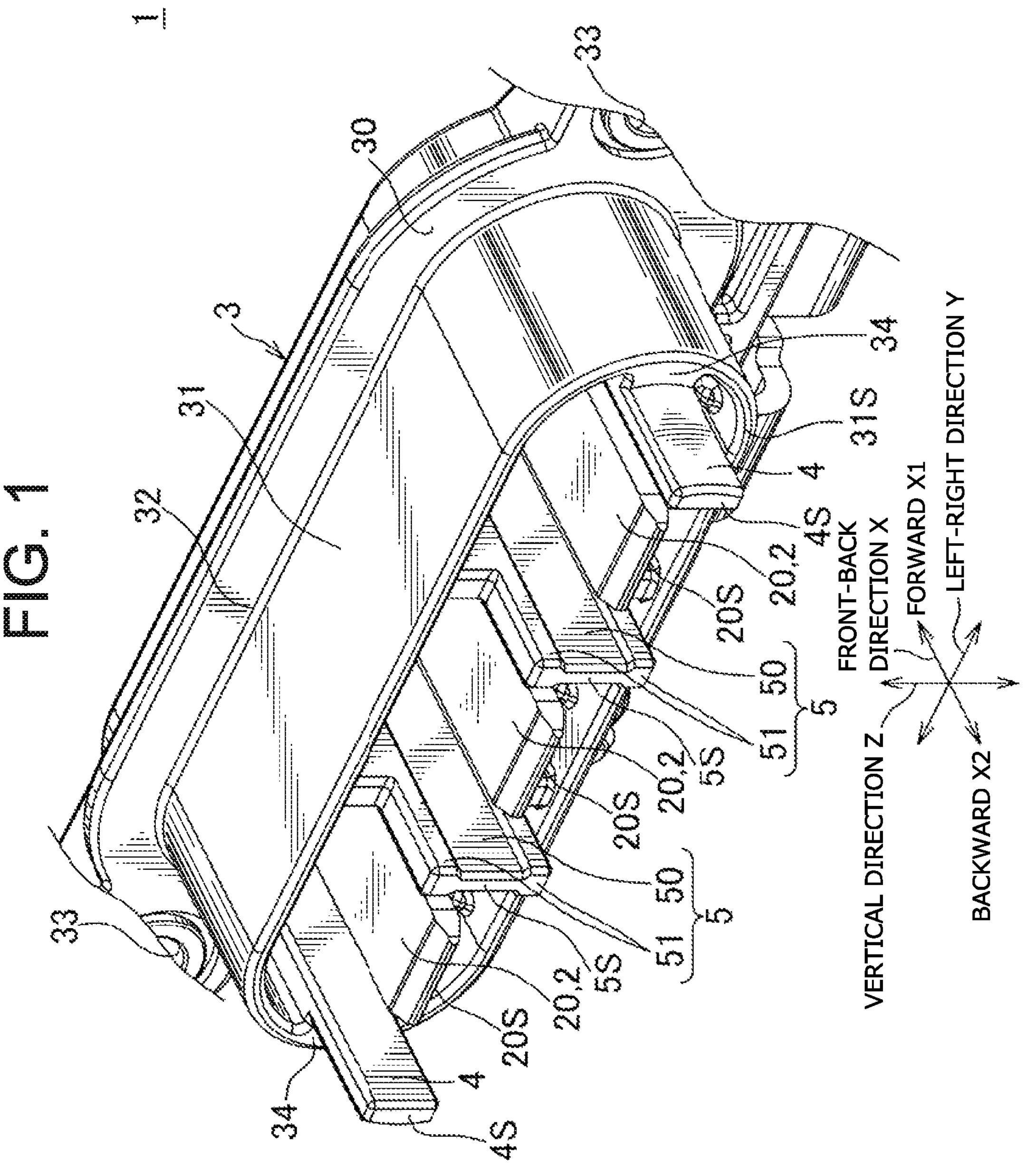
FIG. 1 is a perspective view illustrating a terminal block as a connector according to an embodiment of the present invention.

As illustrated in FIG. 1, the terminal block 1 of the present embodiment includes three (at least one) first terminals 2 and a housing 3 that supports the first terminals 2.

Hereinafter, arrows X, Y, and Z are directions orthogonal to each other. A front-back direction in which the terminal block 1 and the mating connector 10 are fitted may be indicated by the "arrow X", a left-right direction Y in which the first terminals 2 are aligned on the terminal block 1 may be indicated by the "arrow Y", and align vertical direction Z orthogonal to the arrow X and the arrow Y may be indicated by the "arrow Z". In the arrow X, a direction in which the mating connector 10 approaches the terminal block 1 may be referred to as a "forward X1", and a direction opposite thereto may be referred to as "backward X2".

Figure 4:
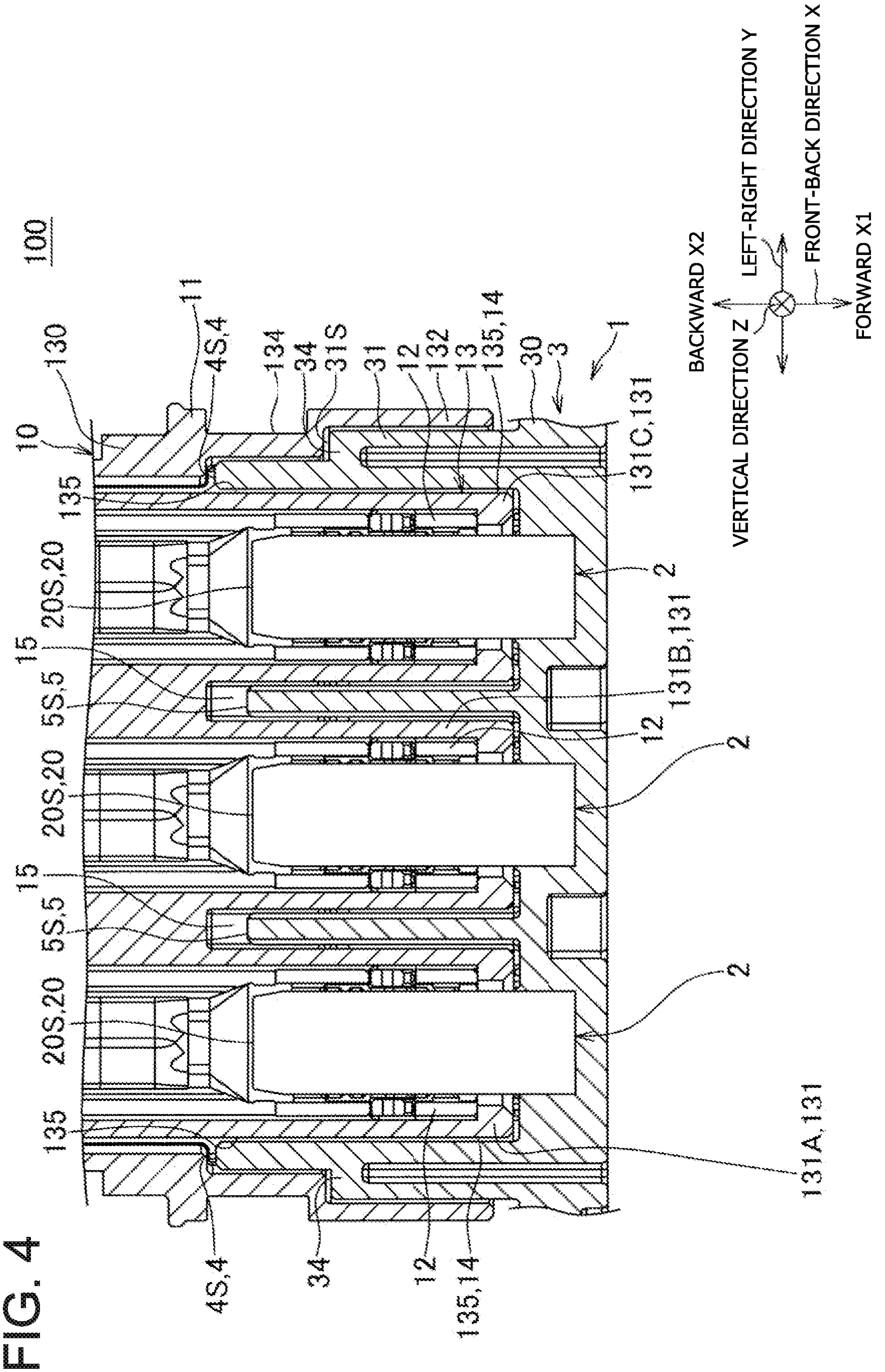
FIG. 4 is a cross-sectional view illustrating a state in which the terminal block and the mating connector are fitted to each other.

Each of the first terminals 2 is formed by performing pressing or the like on a conductive metal plate and includes an electrical contact portion 20 electrically connected to a second terminal 12 of the mating connector 10 as illustrated in FIG. 4. The electrical contact portion 20 is formed in a band plate shape, and also the three first terminals 2, 2, and 2 are provided such that the width direction of each electrical contact portion 20 is aligned in the left-right direction Y.

Figure 2:
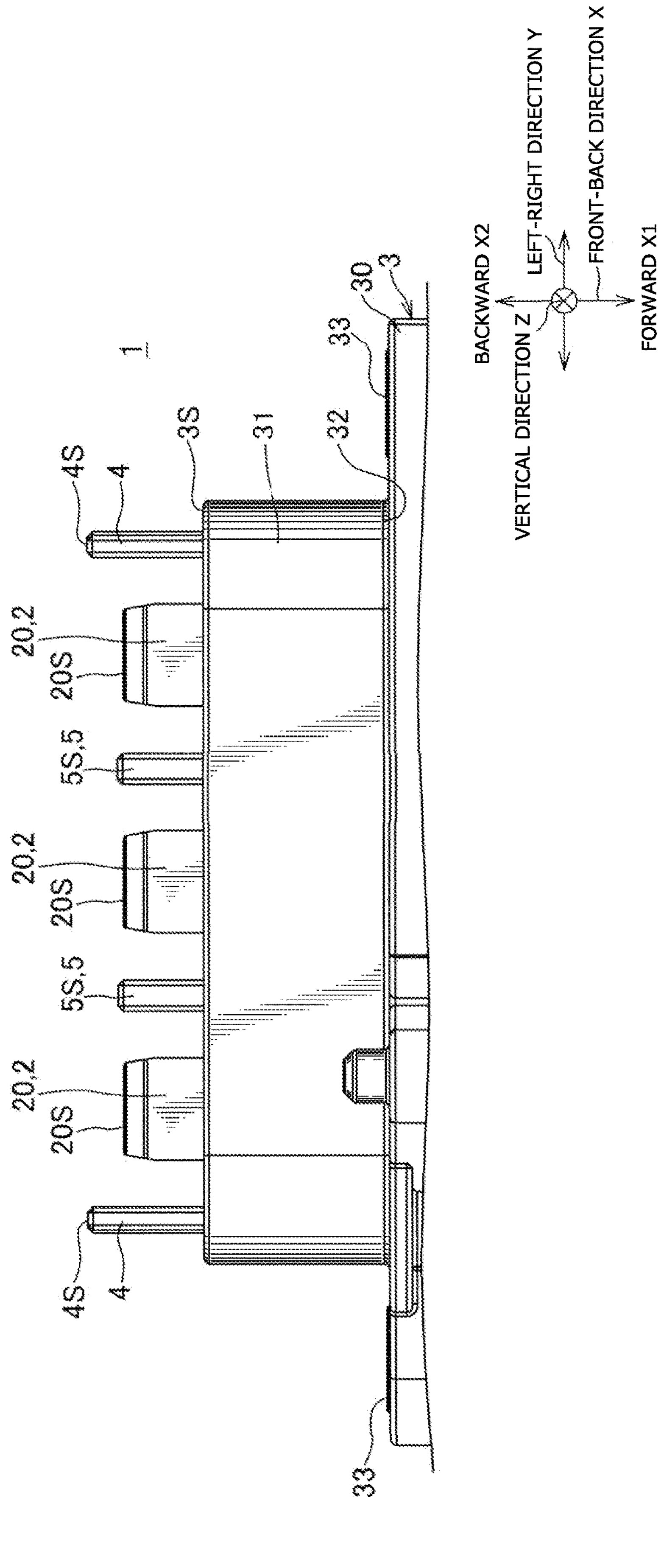
FIG. 2 is a plan view illustrating the terminal block.

The housing 3 is configured with an insulating synthetic resin. As illustrated in FIGS. 1 and 2, the housing 3 includes a base 30 that supports the three first terminals 2, 2, and 2, a hood portion 31 that is provided to protrude backward X2 (toward the mating connector) from the base 30 and surrounds the electrical contact portion 20 of each first terminal 2, positioning ribs 4 that are formed to extend backward X2 (toward the mating connector), and guide ribs 5 that are formed to extend backward X2.

The base 30 is formed in a plate shape having a predetermined thickness. The base 30 includes a base main body 32 in which a root of the hood portion 31 described below is positioned and a pair of fastening portions 33 and 33 that are provided to extend on both sides of the base main body 32 in the left-right direction Y and are to fasten the base main body 32 to be fastened with a bolt.

The electrical contact portions 20 of the first terminals 2 are supported on the base main body 32 so as to be aligned in the left-right direction Y.

As illustrated in FIG. 1, the hood portion 31 is formed in an elliptical cylindrical shape elongated in the left-right direction Y. Inside the hood portion 31, the three electrical contact portions 20, 20, and 20 are provided to be aligned in the left-right direction Y. A hood length of the hood portion 31 (a dimension from the base 30 to a distal end 31S of the hood portion 31) is formed to be shorter than an axial dimension of each electrical contact portion 20, and a distal end portion 20S of each electrical contact portion 20 is provided to protrude from the hood portion 31.

As illustrated in FIG. 1, the pair of positioning ribs 4 are provided at both end portions of the hood portion 31 in the left-right direction Y. That is, the pair of positioning ribs 4 and 4 are provided on both sides of the three electrical contact portions 20, 20, and 20 in the left-right direction Y. Each of the positioning ribs 4 is formed in a band plate shape having a base end continuous with the base 30 and a distal end 4S extending backward X2. Also, an intermediate position of each positioning rib 4 is provided to be continuous with a continuous portion 34 of the hood portion 31. Also, the pair of positioning ribs 4 and 4 are provided such that the plate width direction is the vertical direction Z, and the plate thickness direction is the left-right direction Y.

Each distal end 4S of the pair of positioning ribs 4 and 4 is positioned at the rearmost end of the terminal block 1 and is configured to first contact the mating connector 10 when being fitted to the mating connector 10. That is, when the pair of positioning ribs 4 and 4 are fitted to the mating connector 10, the pair of positioning ribs 4 and 4 are configured to first come into contact with the mating connector 10 and enter a pair of positioning rib entering spaces 14 and 14 described below of the mating connector 10.

Further, the pair of positioning ribs 4 and 4 are slidably guided in a connector fitting direction X by guide portions 135 described below by entering the pair of positioning rib entering spaces 14 and 14 of the mating connector 10 with the three terminal accommodating portions 131 interposed therebetween. Even if the terminal block 1 falls off, the first terminal 2 is protected by the pair of positioning ribs 4 and 4.

As illustrated in FIG. 1, two guide ribs 5 are provided in the present embodiment. The two guide ribs 5 and 5 are provided between the three electrical contact portions 20, 20, and 20 and are configured to enter between the terminal accommodating portions 131 adjacent to each other of the mating connectors 10 (guide rib entering spaces 15 described below). Each of the guide ribs 5 is formed in a band plate shape having a base end continuous with the base 30 and a distal end 5S extending backward X2. Also, each of the guide ribs 5 are provided such that the plate width direction is the vertical direction Z, and the plate thickness direction is the left-right direction Y.

In the terminal block 1, the distal end 5S of each guide rib 5 is positioned forward X1 (on the base 30 side) from the distal end 4S of each positioning rib 4 and is provided at substantially the same position as a distal end 20S of each electrical contact portion 20 in the front-back direction X.

Each of the guide ribs 5 includes a guide rib main body 50 in a band plate shape and a pair of overhanging portions 51 and 51 provided so as to protrude from both upper and lower ends of the guide rib main body 50 to both sides in the left-right direction Y and is formed in an I-shape in front view.

The guide rib 5 is configured such that, when entering the guide rib entering space 15 of the mating connector 10, each terminal accommodating portion 131 is positioned between the pair of overhanging portions 51 and 51 in the vertical direction Z, and also outer surfaces of the adjacent terminal accommodating portions 131 come into contact with the front and back surfaces of the guide rib main body 50. That is, when the guide rib 5 enters the guide rib entering space 15 of the mating connector 10, the terminal accommodating portions 131 are positioned in the vertical direction Z and the left-right direction Y between the pair of overhanging portions 51 and 51 and are slidably guided in the connector fitting direction X.

The mating connector 10 is a so-called shield connector and includes a cylindrical braided conductor (not illustrated) that wraps three electric wires (not illustrated), a shield shell 11 having a mounted portion (not illustrated) which the braided conductor covers, a mating housing 13 that is accommodated in the shield shell 11 and holds the second terminal 12, and a rear holder (not illustrated) that is mounted on a rear end portion (end portion) of the mating housing 13 and supports the three electric wires, as illustrated in FIG. 4.

The mating housing 13 is configured with an insulating synthetic resin. The mating housing 13 includes a mating base 130, the three terminal accommodating portions 131A, 131B, and 131C (131) (tubular portions) that are provided to protrude forward X1 from the mating base 130 and accommodate the respective second terminals 12, a mating hood portion 132 that is provided to protrude forward X1 from the mating base 130 and surrounds the three terminal accommodating portions 131A, 131B, and 131C, and a tubular portion (not illustrated) that is continuous backward X2 from the three terminal accommodating portions 131A, 131B, and 131C and is covered with the shield shell 11. A component installation portion 134 in which a seal member 6 (component, illustrated in FIG. 3) is installed is provided at a rear end of the mating hood portion 132.

Figure 3:
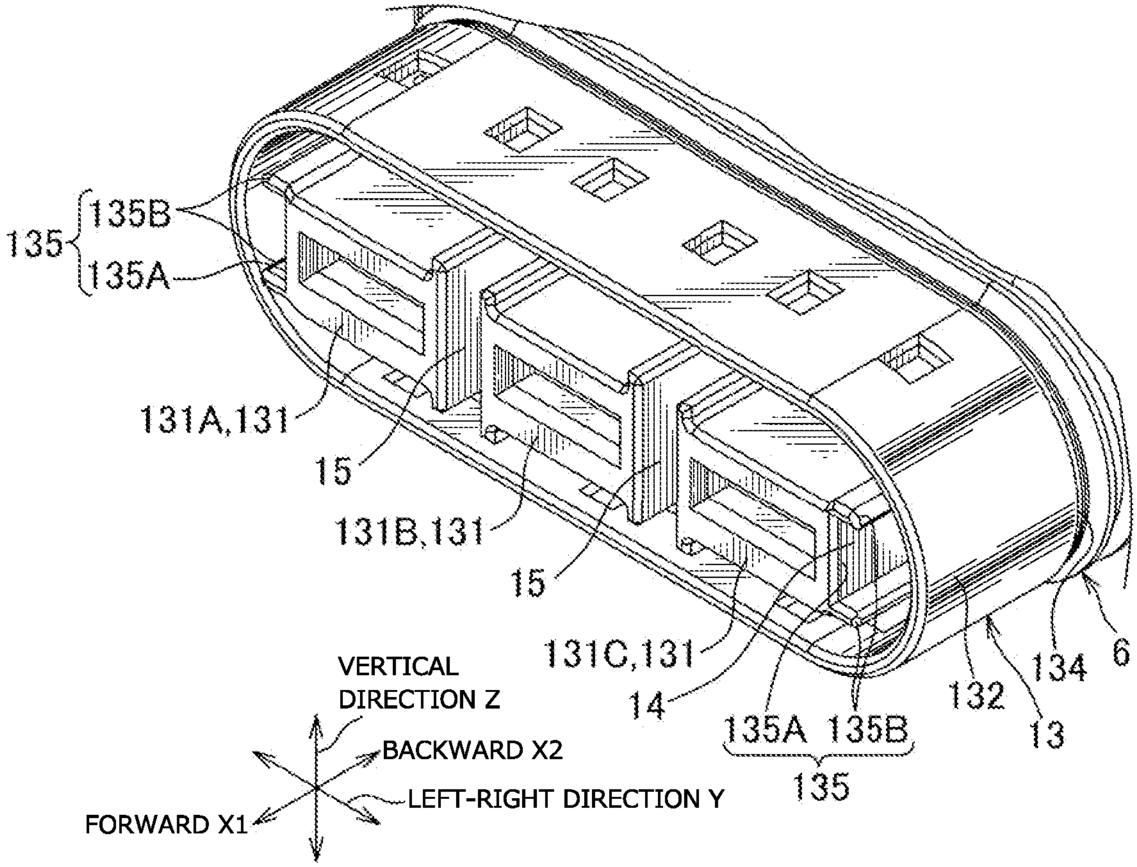
FIG. 3 is a perspective view illustrating a mating connector fittable to the terminal block.

As illustrated in FIG. 3, each of the three terminal accommodating portions 131A, 131B, and 131C is formed in a rectangular cylindrical shape and is formed so that the axis thereof extends in the front-back direction X. The second terminal 12 is accommodated in each of the terminal accommodating portions 131, and each of the first terminals 2 of the terminal block 1 is configured to be in electrical contact with the second terminal 12 of each of the terminal accommodating portions 131 when the mating connector 10 is fitted to the terminal block 1.

As illustrated in FIG. 3, the three terminal accommodating portions 131A, 131B, and 131C are provided at intervals from each other, and the guide rib entering space 15 which the guide rib 5 of the terminal block 1 can enter is configured between the adjacent terminal accommodating portions 131A, 131B, and 131C.

As illustrated in FIG. 3, the guide portion 135 that guides each positioning rib 4 in the front-back direction X (connector fitting direction) is provided on each outer surface of the terminal accommodating portions 131A and 131C positioned at the end portion in the left-right direction Y among the three terminal accommodating portions 131A, 131B, and 131C.

The guide portion 135 includes a slide portion 135A on each outer surface of the terminal accommodating portions 131A and 131C and a pair of rail portions 135B and 135B formed to protrude at both end edges of the slide portion 135A in the vertical direction Z and is configured such that the positioning ribs 4 enters the positioning rib entering space 14 formed by the slide portion 135A and the pair of rail portions 135B and 135B.

In such a guide portion 135, when the positioning ribs 4 of the terminal block 1 enter the positioning rib entering space 14, the positioning ribs 4 are positioned between the pair of rail portions 135B and 135B in the vertical direction Z, and also the positioning ribs 4 are slidably configured on the slide portion 135A.

As illustrated in FIG. 3, the mating hood portion 132 is configured to be externally fitted to the hood portion 31 of the terminal block 1 when the terminal block 1 is fitted to the mating connector 10. Here, the axial dimension of the hood portion 31 of the terminal block 1 is formed to be shorter than the axial dimension of the positioning rib 4. According to this, the axial dimension (dimension in the front-back direction X) at the fitting time when the terminal block 1 and the mating connector 10 are fitted to each other is shortened by the amount by which the axial dimension of the hood portion 31 is shortened as compared with the related art.

When the terminal block 1 is fitted to the mating connector 10, as illustrated in FIG. 4, as the mating connector 10 moves forward X1 so as to approach the terminal block 1, an opening of the mating hood portion 132 positioned at the front end of the mating housing 13 in the mating connector 10 is brought close to the terminal block 1. As the movement further proceeds, the distal end 4S of each positioning rib 4 of the terminal block 1 abuts against the guide portion 135 of the mating connector 10. The pair of positioning ribs 4 and 4 enters the pair of positioning rib entering spaces 14 and 14 of the mating connector 10 with the three terminal accommodating portions 131 interposed therebetween. In this manner, the terminal block 1 and the mating connector 10 are positioned in the left-right direction Y. Each positioning rib 4 is positioned between the pair of rail portions 135B and 135B of each guide portion 135, is positioned in the vertical direction Z, is slid by the slide portion 135A, and is guided in the connector fitting direction X.

The movement of the mating connector 10 further progresses, and the distal end 5S of each guide rib 5 of the terminal block 1 is inserted into the guide rib entering space 15 between the terminal accommodating portions 131 adjacent to each other of the mating connector 10. The terminal accommodating portions 131 are positioned between the pair of overhanging portions 51 and 51 of the guide ribs 5 in the vertical direction Z, and the outer surfaces of the adjacent terminal accommodating portions 131 come into contact with the front and back surfaces of the guide rib main body 50. As a result, the terminal accommodating portions 131 are positioned in the vertical direction Z and the left-right direction Y between the pair of overhanging portions 51 and 51, the movement of the mating connector 10 further proceeds, and the terminal accommodating portions 131 are slidably guided in the connector fitting direction X by the front and back surfaces of the guide rib main bodies 50.

The movement of the mating connector 10 further proceeds, the first terminal 2 comes into contact with the second terminal 12 positioned inside each terminal accommodating portion 131, the movement further proceeds, and each first terminal 2 and each second terminal 12 are electrically connected. Thereafter, when the mating connector 10 reaches a predetermined position of the terminal block 1, the movement of the mating connector 10 is stopped. In this manner, the mating connector 10 is fitted to the terminal block 1.

According to the embodiment described above, the pair of positioning ribs 4 are provided on both sides of the first terminal 2 (terminal) in the plate width direction inside the hood portion 31, the root is continuous to the base 30, and the distal end portion 4S is provided to protrude from the hood portion 31. Accordingly, the terminal block 1 is positioned with respect to the mating connector 10 by the pair of positioning ribs 4. As a result, hitting or twisting of the terminal block 1 (connector) with respect to the mating connector 10 is suppressed. As a result, the terminal accommodating portions 131 are positioned in the vertical direction Z and the left-right direction Y between the pair of overhanging portions 51 and 51, the movement of the mating connector 10 further proceeds, and the terminal accommodating portions 131 are slidably guided in the connector fitting direction X by the front and back surfaces of the guide rib main bodies 50. As a result, it is possible to achieve the miniaturization of the size of the mating connector 10 in the radial direction and the axis direction, and it is possible to achieve the miniaturization of the size in the radial direction and the axis direction at the time of fitting the connector while securing the assemblability at the time of fitting the connector.

The distal end 20S of the first terminal 2 (terminal) is positioned between the distal end 31S of the hood portion 31 and the distal ends 4S of the positioning ribs 4. As a result, it is possible to realize the configuration in which hitting or twisting of the connector with respect to the mating connector 10 is suppressed.

In addition, the plurality of first terminals 2 (terminals) are provided, the guide rib 5 is provided between the adjacent first terminals 2 (terminals), a root of the is continuous with the base 30, and a distal end portion 5S of the guide rib 5 is provided to protrude from the hood portion 31. As a result, the guide rib 5 enters between the adjacent terminal accommodating portions 131 of the mating connector 10, whereby each first terminal 2 is positioned in the fitting direction of each terminal accommodating portion 131. As a result, hitting or twisting of the connector with respect to the mating connector 10 is further suppressed.

The distal ends 5S of the guide ribs 5 are positioned at the same position as the distal ends 20S of the first terminals 2 (terminals) in the direction in which the guide ribs 5 extend. Accordingly, the first terminal is positioned with respect to the mating connector 10 by the positioning ribs 4 and the guide ribs 5. As a result, it is possible to realize the configuration in which hitting or twisting of the terminal block 1 (connector) with respect to the mating connector 10 is suppressed.

The mating connector 10 includes the terminal accommodating portions 131 (tubular portions) into which the first terminals 2 (terminals) are inserted, and the guide portions 135 that guide the positioning ribs 4 in the connector fitting direction X is provided on the outer surfaces of the terminal accommodating portions 131. According to this, the terminal block 1 (connector) and the mating connector 10 are positioned by the positioning ribs 4 and are guided to the back side in the connector fitting direction X by the guide portions 135, and it is possible to achieve miniaturization in the radial direction and the axis direction at the time of fitting the connector while further ensuring the assemblability at the time of fitting the connector.

Note that the present invention is not limited to the above embodiment and includes other configurations and the like that can achieve the object of the present invention, and the following modifications and the like are also included in the present invention.

In the above embodiment, the distal ends 5S of the guide ribs 5 are configured to be at the same position as the distal ends 20S of the first terminals 2 (terminal) in the direction in which the guide ribs 5 extend, but the present invention is not limited thereto. The distal end 5S of the guide rib 5 may be configured to be positioned between the distal end 20S of the first terminal 2 (terminal) and the distal end 4S of the positioning ribs 4.

In the above embodiment, the terminal block is described as an example of the connector in the claims, but the present invention is not limited thereto. A connector that includes a terminal and a housing that accommodates the terminal may be used.

In addition, the best configuration, method, and the like for carrying out the present invention are disclosed in the above description, but the present invention is not limited thereto. That is, although a specific embodiment is mainly particularly illustrated and described in the present invention, a person skilled in the art can make various modifications to the above-described embodiment in shapes, materials, quantities, and other detailed configurations without departing from the scope of the technical concept and the object of the present invention. Therefore, the description in which the shapes, the materials, and the like disclosed above are limited is illustratively described for better understanding of the present invention and does not limit the present invention. Therefore, the description in the name of the member in which a part or all of the limitations such as the shapes and the materials are removed is included in the present invention.

REFERENCE SIGNS LIST

1 terminal block (connector)
100 terminal block unit (connector unit)
2 first terminal (terminal)
20S distal end of terminal
3 housing
30 base
31 hood portion
31S distal end of hood portion
4 positioning ribs
4S distal ends of positioning ribs
5 guide ribs
10 mating connector
131A, 131B, 131C (131) terminal accommodating portion (tubular portion)
135 guide portions

What is claimed is:

1. A connector that is fittable to a mating connector, the connector comprising:

a plurality of terminals having a plate shape; and a housing configured to support the terminals, wherein the housing includes a base that supports the terminals, a hood portion that is provided to protrude from the base toward the mating connector and surrounds the terminals, and positioning ribs that are formed to extend toward the mating connector, and a pair of the positioning ribs is provided on both sides of the terminals in a plate width direction inside the hood portion, roots of the positioning ribs are continuous with the base, and distal end portions of the positioning ribs are provided to protrude from the hood portion, wherein a guide rib is provided between the terminals adjacent to each other, wherein the guide rib has a band plate shape with a width along a vertical direction, the vertical direction extending orthogonally to the plate width direction of the terminals, wherein the guide rib is provided such that a root of the guide rib is continuous with the base and a distal end portion of the guide rib protrudes from the hood portion, wherein the guide rib includes a pair of overhanging portions protruded from both upper and lower ends of the guide rib in the plate width direction of the terminals, wherein the pair of overhanging portions is configured to allow one or more of tubular portions of the mating connector to be placed between the pair of overhanging portions at the upper and lower ends so that a plate surface of the guide rib comes into contact with one or more outer surfaces of the one or more of the tubular portions and the terminals are inserted into the tubular portions.

2. The connector according to claim 1, wherein a distal end of each of the terminals is positioned between a distal end of the hood portion and the distal end portions of the positioning ribs.

3. The connector according to claim 1, wherein the distal end portion of the guide rib is positioned at the same position as a distal end of each of the terminals or between distal ends of the terminals and the distal end portions of the positioning ribs in a direction in which the guide rib extends.

4. A connector unit comprising: the connector according to claim 1, and the mating connector to be fitted to the connector, wherein the mating connector includes the tubular portions into which the terminals are inserted, and a guide portion that guides the positioning ribs in a connector fitting direction is provided on an outer surface of each of the tubular portions.

* * * * *